Feb. 20, 1968 — A. C. CARETTO ET AL — 3,369,650

ARTICLE FEEDING APPARATUS

Original Filed May 28, 1964 — 12 Sheets-Sheet 1

INVENTORS
ANTONI C. CARETTO
FREDERICK W. KOEPKE, Jr.
BY

ATTORNEYS

Feb. 20, 1968    A. C. CARETTO ETAL    3,369,650
ARTICLE FEEDING APPARATUS
Original Filed May 28, 1964    12 Sheets-Sheet 5

FIG. 8

INVENTORS
ANTONI C. CARETTO
FREDERICK W. KOEPKE, Jr.
BY
Curtis, Morris & Safford
ATTORNEYS INVENTORS
ANTONI C. CARETTO
FREDERICK W. KOEPKE, Jr.
BY
Curtis, Morris & Safford
ATTORNEYS Feb. 20, 1968     A. C. CARETTO ET AL     3,369,650
ARTICLE FEEDING APPARATUS
Original Filed May 28, 1964     12 Sheets-Sheet 7

INVENTORS
ANTONI C. CARETTO
FREDERICK W. KOEPKE, Jr.
BY
*Curtis, Morris & Safford*
ATTORNEYS

FIG. 17

Feb. 20, 1968   A. C. CARETTO ET AL   3,369,650
ARTICLE FEEDING APPARATUS
Original Filed May 28, 1964   12 Sheets-Sheet 10

INVENTORS
ANTONI C. CARETTO
FREDERICK W. KOEPKE, JR
BY
Curtis, Morris & Safford
ATTORNEYS United States Patent Office 3,369,650
Patented Feb. 20, 1968

3,369,650
ARTICLE FEEDING APPARATUS
Antoni C. Caretto, Dearborn, and Frederick W. Koepke, Jr., Detroit, Mich., assignors to Ajem Laboratories, Inc., Livonia, Mich.
Continuation of application Ser. No. 538,512, Feb. 16, 1966, which is a continuation of application Ser. No. 371,036, May 28, 1964. This application Feb. 15, 1967, Ser. No. 616,412
3 Claims. (Cl. 198—219)

This application is a continuation of our copending application Ser. No. 538,512, filed Feb. 16, 1966, which is a continuation of application Ser. No. 371,036, filed May 28, 1964, now abandoned.

This invention relates to an article transfer apparatus and in particular to an article transfer apparatus adapted to assure a ready supply of articles to be maintained for efficiently feeding automated equipment. The apparatus of this invention senses a vacant position ahead in a conveyor system and advances trailing articles until each such position is filled.

The maintenance of a steady supply of articles to automated equipment is highly desirable for a number of reasons and often is essential to continuing operation. First, if a conveyor system fails to supply an article to an automated machine, the machine may go through an unproductive cycle, diminishing the output of the machine and increasing the production cost per machined article. Also, in many automated operations several articles are required before the machinery can proceed with its operation; if one article is missing on any of the conveyor systems carrying required articles to the operation, all conveyor systems must stop until the void in the unfilled conveyor system is filled. In many machines increased wear or even breakage may result if they are allowed to operate through a cycle without an article in position for treatment. For example, the machine may be seriously out of balance without the article and increased wear on bearings, etc. may result.

Among the devices used to eliminate vacancies in the article supply have been gravity-feed units, including roller conveyors. However, should a void occur in these machines because of some malfunction, there is no way to assure a positive forward displacement of articles to fill the vacancy. Furthermore, such equipment is not normally adapted for the handling of large articles such as motor blocks, etc.

It is an object of the present invention to provide a transfer apparatus that assures a continuous supply of articles in a conveying system by positively and simultaneously displacing articles from a supply into a vacant position or positions that may, for any reason occur.

It is another object of the invention to provide a uniquely automated transfer apparatus whereby the absence of an article at any position is sensed and remedied automatically.

It is another object of the invention to provide a transfer apparatus comprising novel actuating means and adapted to be used on conveyor systems.

It is still another object of the invention to provide a transfer apparatus for quickly and conveniently positively displacing even heavy objects forward from station to station so as to bring such objects precisely in the desired orientation.

Applicants have provided by the present invention an article handling apparatus which can achieve some or all of the foregoing objects. The apparatus of the present invention maintains an uninterrupted supply of articles ready for feeding into, for example, a machine operation, by apparatus providing one or more stations, i.e., places at which an article may be at rest, and means for pushing, i.e., positively displacing, articles forward from station to station or from station to point of use, as the articles are used up. An important aspect of the invention is the means by which the presence or absence of articles in stations downline (i.e., closer to the use position, e.g., an operation) is communicated to the pushing means of the preceding stations thus assuring that all stations will be kept supplied with an article.

These results have been achieved by providing each station with a sensing means by which the presence or absence of an article may be sensed, a controlling means having a communicating part and a mechanical actuating part by which the presence or absence of an article in a station nearer to the machine being fed may be used to control the position of a positive-acting pushing means in an immediately preceding station and thus control the flow of articles.

The sensing means may be an electric eye, a feeler switch or other such device placed to sense the presence or absence in a given station, and to respond to (i.e., be operated by) an article at the same station wherein the sensing means is located.

The controlling means normally comprise a signal network including a communicating part such as electrical, hydraulic, pneumatic or mechanical linkage system and a switching means, usually a mechanical actuating part such as a solenoid operated dog, clutch or valve for pressure actuated mechanism. One embodiment of the present invention has a pneumatically-operated, compact and reliable actuating mechanism responsive to said controlling means which is pivotally mounted and directly controls the position of article pushing means at each station from which the pushing means is adapted to propel a part forward.

This invention may be used in a conveyor system wherein the entire carrying or article-propulsion movement can be accomplished by pivoting action of dogs or other pushing means, where means are provided for returning the dogs or other pushing means to their original position by an auxiliary conveyor system.

However, it is especially advantageous to use the invention in conjunction with auxiliary conveying means for example a shuttle conveyor the use of which is described in U.S. Patent 2,979,062 and walking beam-type conveyors as disclosed in commonly owned and copending application of Umbricht et al., Ser. No. 179,412, filed Mar. 13, 1962, and U.S. Patent Nos. 3,139,171 and 3,187,883.

In such embodiments of the invention, a number of propelling means mounted on a shuttle or walking beam normally operate back and forth between two article resting places or stations. Thus, each station has a propelling means that travels back and forth between its own station and a preceding or succeeding station and carries articles to the forward station only when no article occupies the forward station upon arrival of the shuttle at the forward station.

In this application and accompanying drawings, we have shown and described preferred embodiments of our invention and have suggested various alternatives and modifications thereof, but it is to be understood that these are not intended to be exhaustive and that various other changes and modifications can be made within the scope of the invention. These suggestions herein are selected and included for purposes of illustration in order that others skilled in the art will more fully understand the invention and the principles thereof and will be enabled to modify it and embody it in a variety of forms, each as may be best suited to the conditions of a particular case.

In the drawings.

FIGURES 10 through 16 pertain to another embodiment of the invention.

FIGURES 17 through 20 pertain to another walking-beam embodiment of the present invention.

Figure 2:
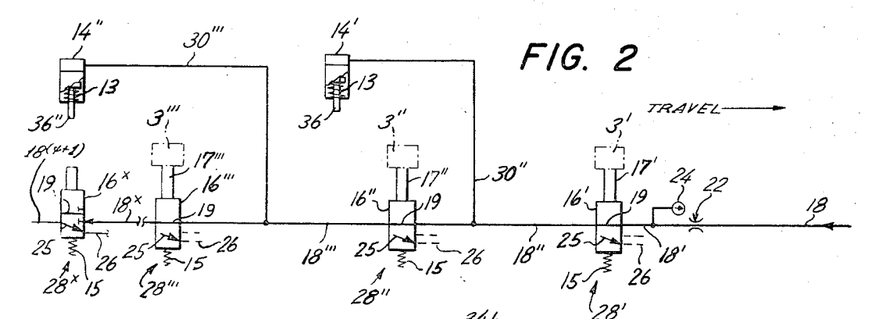
FIGURE 2 is a schematic diagram of a pneumatic communicating means useful in the present apparatus.

In the accompanying drawings there is shown a conveyor apparatus for transferring parts intermittently through a series of stations ($28'$, $28''$ . . . $28^x$, as represented in FIGURE 2) to a use position, ordinarily a machine to be fed or an assembly line position where the article is to be assembled into an apparatus being made.

Figure 1:
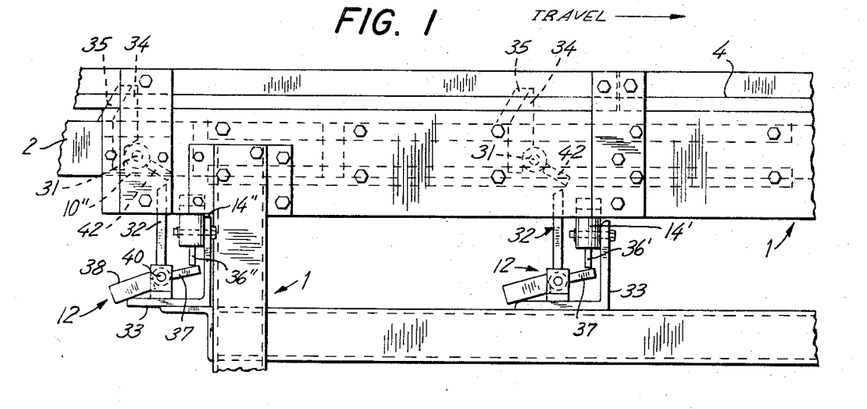
FIGURE 1 is a side elevational view of a section of a shuttle conveyor assembly incorporating apparatus of the present invention.

Shown in FIGURE 1 is only a representative part of the conveyor with adjacent parts broken away, but those skilled in the art will understand the relation to the rest of the apparatus especially by reference to U.S. Patent 2,979,062.

The main frame of this apparatus is shown as 1. (See also FIGURES 10 and 11.) On this is mounted a reciprocating shuttle member 2 (see FIGURES 1, 4 and 5) corresponding in function and operation to shuttle bar 48 of the Patent 2,979,062, for conveying the articles (represented diagrammatically by 3 in FIGURE 2).

Figure 5:
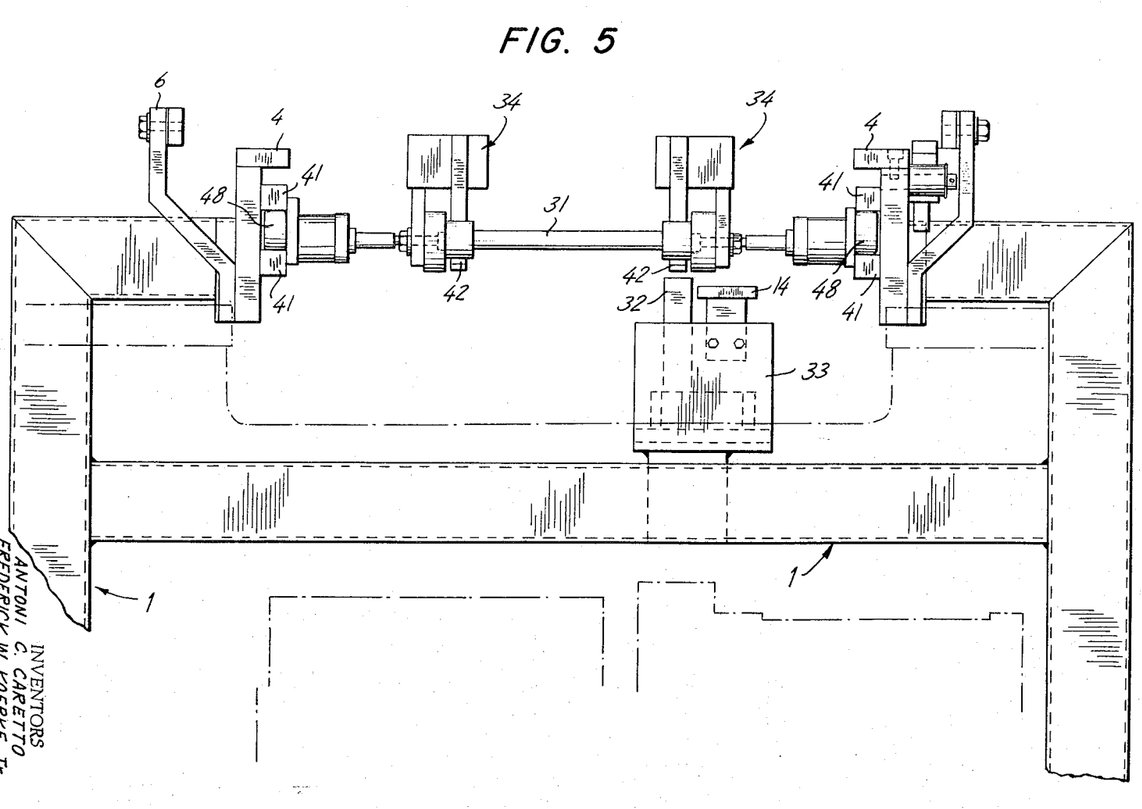
FIGURE 5 is an end elevational view of a conveyor section showing the parts shown in FIGURES 3 and 4, but in relation to the article track and conveyor frame.

These articles are pushed along on rails 4, between guide rails 6 intermittently by dog assemblies 10, which engage the articles and advance them one station at a time (see FIGURES 1 and 5).

Referring to FIGURE 1, two successive stations of a conveyor line are shown. Each station has its dog assembly 10, a bell crank tripper assembly 12, and an air-operated, spring-returned, actuating cylinder 14 which is returned by spring 13. (Shown schematically in FIGURE 2.)

Also shown in FIGURE 2 are a series of mechanically operated pneumatic slide valves 16, and means for supplying air pressure serially through them from the last station $28'$ adjacent to the operation to which the articles are being supplied, through the other stations $28^x$ to the station $28^n$ most remote from said operation.

This air pressure line 18 has a pressure control valve 22, and a pressure gauge 24, diagrammatically shown in FIGURE 2.

The pneumatic slide valves 16 as shown each have two passages, 19 and 25, one to connect the successive sections of the pressure line, $18'$, $18''$, $18'''$, etc., and the other to vent the pressure from the preceding (i.e., downstream) line when it is required to restore the piston and rod 36 of the actuating motor 14 to the released position. The operating position with the first passage 19 connected so as to complete line 18 is illustrated at positions $28'$–$28'''$; and the release position, with the second passage 25 connected from the higher portions, is illustrated at position $28^x$. In the release position, the passage 19 is raised above its operative position and the passage 25 connects the line 18 above the station, as at $28^x$, with an exhaust outlet or vent 26.

Figures 9, 14, 15:
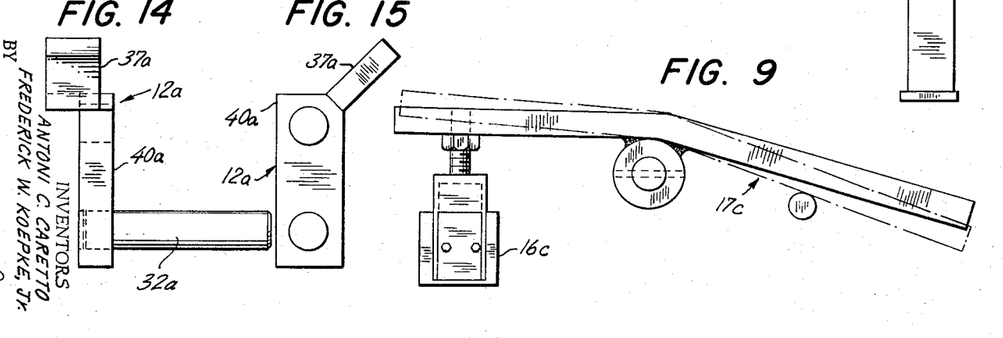
FIGURE 9 is a side elevational view of an article sensing device, a feeler mechanism, showing its position in relation to a pneumatic valve.
FIGURE 14 is an elevational view of a pivot assembly showing the bar thereof as seen from the end of a conveyor line.
FIGURE 15 is a side elevational view of pivot assembly 60.

When an article $3'$ is positioned in last station $28'$ (FIGURE 2) the article mechanically depresses and holds down pneumatic slide valve $16'$ to connect passage 19 between $18'$ and $18''$. A feeler mechanism represented diagrammatically at $17'$ (see also FIGURE 9 and cf. FIGURE 10), is connected to the slide of valve 16 so that, when depressed, air pressure is conducted through pressure line 18 to the valve $16''$ of the next preceding station $28''$ and through connection $30''$ to the actuating cylinder $14''$ to operate tripper assembly 12 to keep the latter from erecting dog assembly 10.

If an article $3''$ is in station $28''$ (FIGURE 2), it presses down its feeler $17''$ to hold valve $16''$ in open position; and the air pressure is communicated through it to the next preceding station $28'''$, and so on from station to station throughout the supply line unless and until the absence of an article from a station allows the feeler mechanism 17 of that station to be pushed up by spring 15, so as to leave its valve 16 closed, as shown at $16^x$, thus to prevent air pressure from proceeding further along the line. As will be seen at station $28^x$, the raising of valve core $16^x$ by its spring 15 closes the line $18^x$ and also opens the line $18^{(x+1)}$ to the atmosphere through passage 25, to vent the air pressure from the line beyond.

If an article 3 is present in each of the stations, air is supplied through the entire series of stations. If however the pneumatic valve 16 of any one station is not pushed down to its operating position by an article on its feeler mechanism, air is not supplied any further down the line, e.g., if no article were present in station 28", station 28''' and all stations downstream from it would not be supplied with air and thus articles from all downstream stations would be moved simultaneously down toward empty station 28", to satisfy the requirement for a part in station 28".

When used in this specification "upstream" will indicate toward the source of fluid pressure (i.e., from $18^x$ to $18'$); however, "preceding" and "rearward" will indicate toward the load position (i.e., from $28^x$ to $28^n$). Similarly, "downstream," "succeeding," and "forward" will indicate the converse, respectively. "Cascade" will indicate an arrangement of parts of an apparatus so that a signal from the first member of the series triggers or supplies a signal in the second and so on through the series.

At each station, propelling dogs 34, pivotally mounted on connecting bar 31, must be erected if an article 3 is to be pushed forward; this is effected immediately upon the requirement for movement of an article, and need not wait for a sequential station-to-station transfer of a signal.

Figure 3:
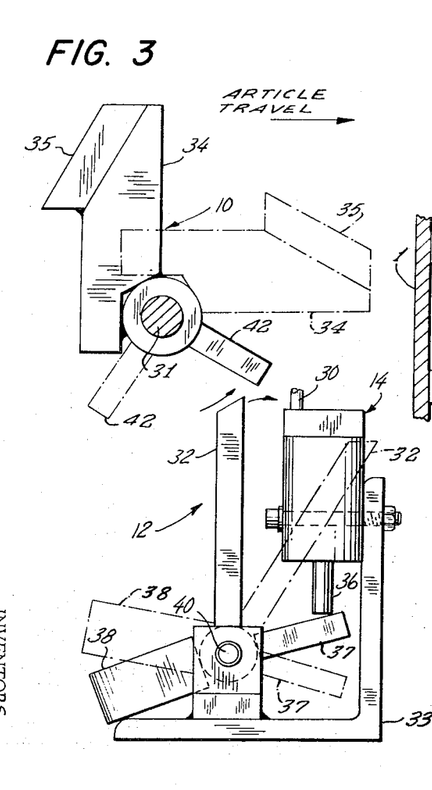
FIGURE 3 is a side elevational view of the propelling means at a station showing a pushing dog at the top adapted to run in the tracks of a shuttle pushing conveyor device, and at the bottom the stationary tripper-mechanism components. The tripper mechanism is in raised position with a pneumatic actuating means and the pushing mechanism in raised positions. Both the dog and the tripper are shown rotated to inoperative positions in dash-dot outline.
Figure 4:
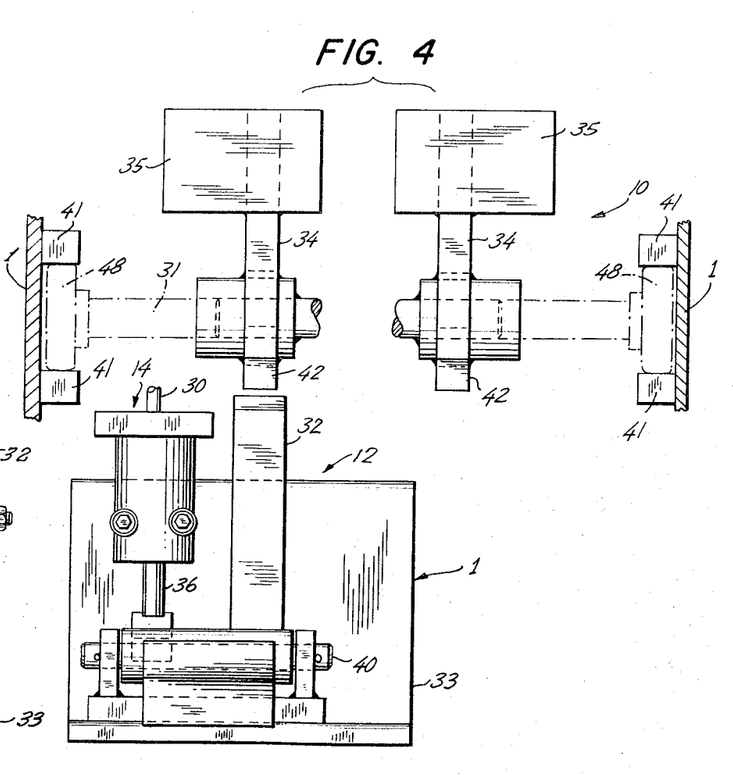
FIGURE 4 is a front elevational view of a part of the shuttle carriage device shown in FIGURE 3 and its track.

Pressure line 18 is connected through 30 at each station to the actuating cylinder 14, so that the pressure in the line at any given station determines the operation of actuating cylinder 14 of the station and the position of tripper arm 32 of bell crank assembly 12 mounted on bracket 33 on the frame is seen in FIGURE 1 and in enlarged detail in FIGURES 3 and 4.

The position of the tripper arm 32 in turn controls the position the dogs 34 will assume during forward movement riding on dog assembly 10. This control is achieved in each station as follows:

Air supplied to cylinder 14 through line 18 and connection 30 extends the piston and piston rod 36 against spring 13, pressing against arm 37 of bell crank assembly 12, swinging it in the direction of the arrows (at the upper end of tripper arm 32 on FIGURE 3), and overcoming the force of counterweight 38. When this pivoting occurs, tripper arm 32 is swung down sufficiently so that it is beyond the path of lever 42 of dog assembly 10 as it is moved back and forth with shuttle conveyor 2. Hence, it cannot engage lever 42 to actuate dog 34.

When air pressure is released from cylinder 14, counterweight 38 swings tripper arm 32 upright again where it will engage lever 42 (when dog assembly 10 in "knocked down" position) when the shuttle carriage 2 moves back; and thus dogs 34 will be swung into raised position behind a part in the proceeding station so they will engage the part and push it forward to the next station.

This action is advantageously accomplished by moving the entire dog assembly 10 forward with the shuttle carriage 2 on tracks 41 of the conveyor system. Rollers or sliders 48 on the dog assembly 10, as seen in FIGURE 4, ride in channel members on the frame 1, which serve as tracks 41.

Figure 6:
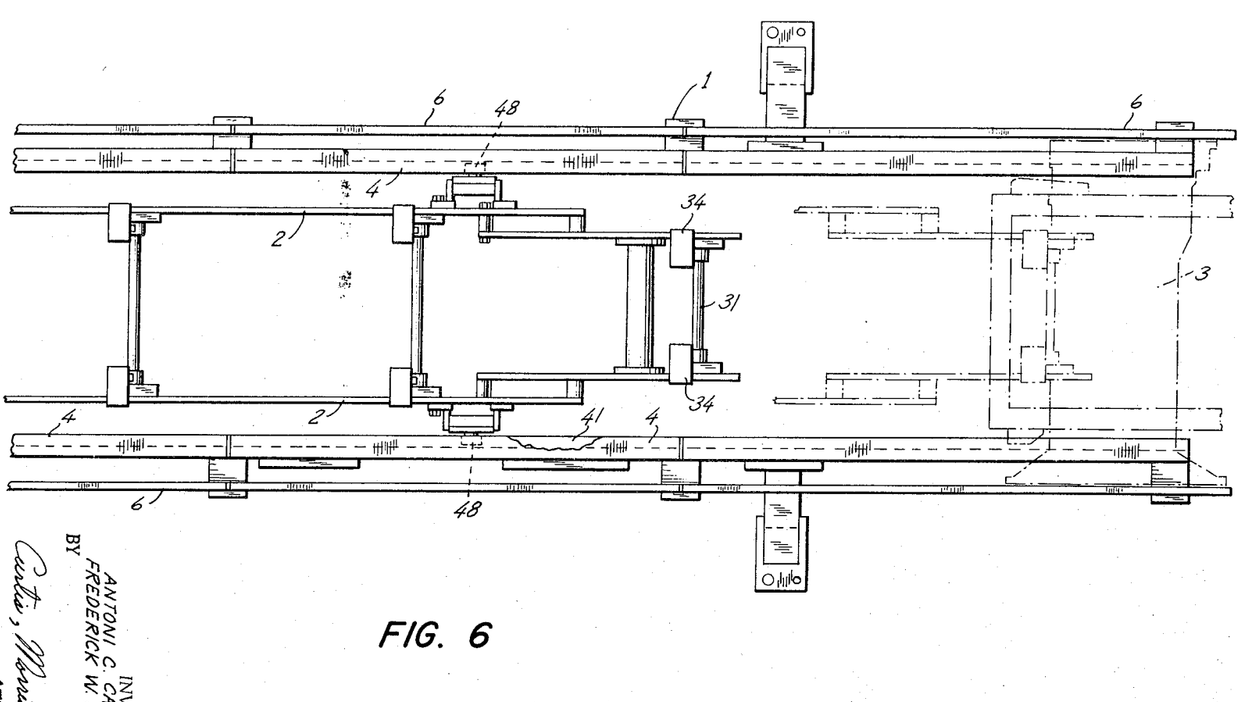
FIGURE 6 is a plan view of the shuttle conveyor shown in FIGURE 1 showing the relationship between propelling means, a shuttle bar, and the forward and rearward position of a propelling means.

In practice, the dog assembly 10 is advantageously mounted on shuttle conveyor 2 which causes the dogs to move forward and backward between two stations. For example, on FIGURE 6 the forward position appears in broken lines, the rearward position in full lines. Assuming the dog has, in erected position, as shown in FIGURES 1 and 3–5, just completed a forward motion pushing a part into the forward station of its two-station cycle, it will start its return travel. If there is an article in the rearward station of the two-station cycle, that article will engage face 35 and cause the dog 34 to pivot into its downward, i.e. non-engaging position (see dash-dotted outline in FIGURE 3). Immediately thereafter, as the shuttle carriage 2 moves backward, lever 42 will pass the position of tripper 32; therefore, depending on the position of tripper 32, the dogs 34 may be flipped, as described above, into article-engaging position for the next forward movement of the shuttle.

FIGURE 5 shows an end elevational view of the parts shown in FIGURES 3 and 4 in relation to article-bearing slide tracks 4 and the shuttle conveyor. Dogs 34 are shown in an erect position ready to engage an article on tracks 4. The shuttle conveyor tracks in which the dog assembly 10 rides are not shown for clarity on FIGURE 5.

Figure 7:
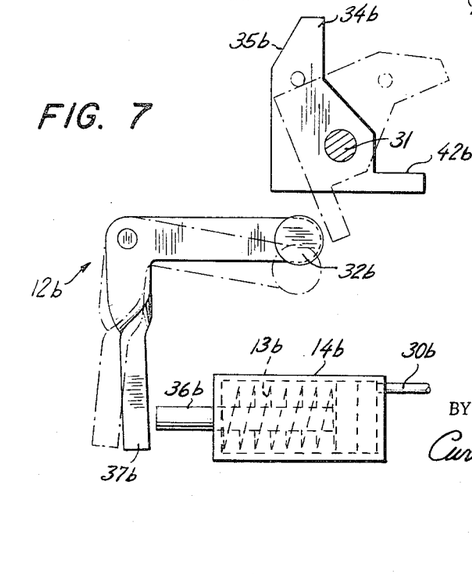
FIGURE 7 is a side elevational view showing alternative dog and tripper parts of the invention.
Figure 8:
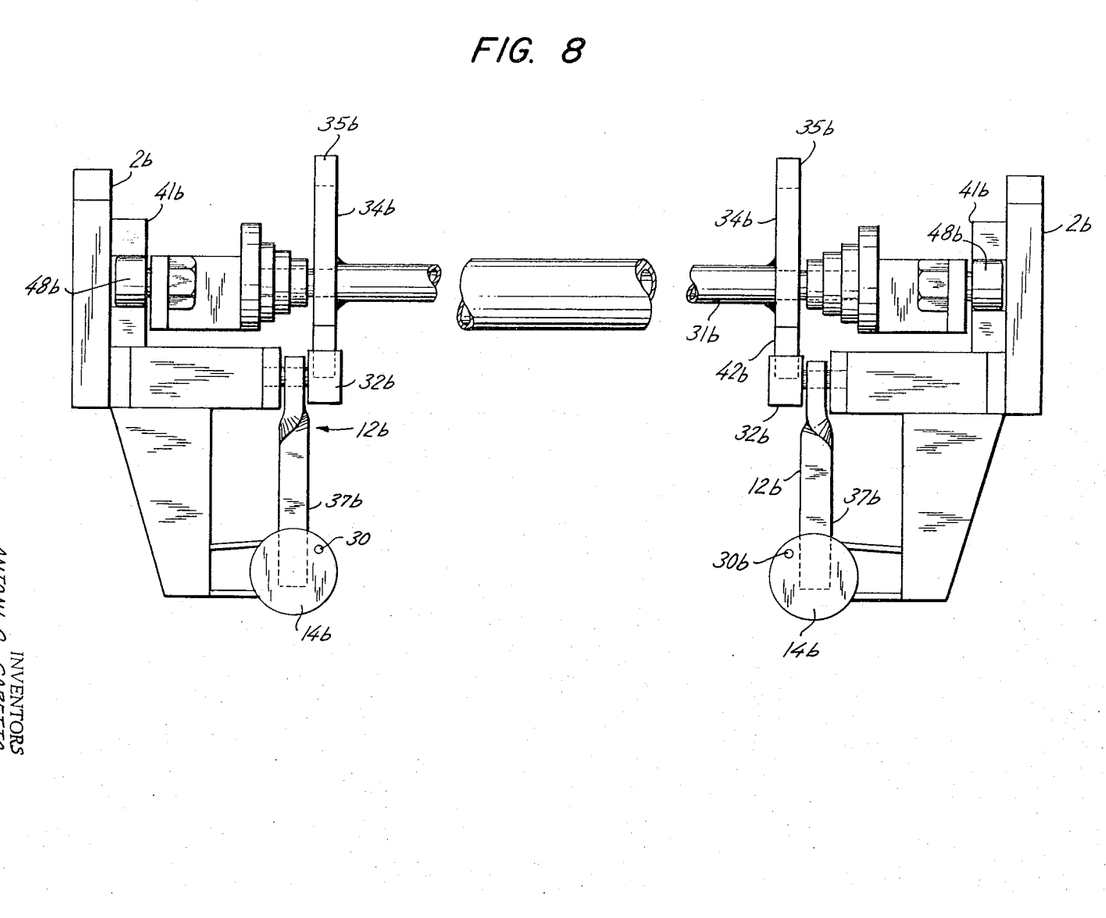
FIGURE 8 is an end elevational view showing the parts shown in FIGURE 7 in relationship to rollers of a shuttle conveyor.

FIGURES 7 and 8 illustrate another kind of dog-and-tripper assembly useful for the present invention. Dog assembly is positioned in article-engaging position by tripper arm 32b on bell crank assembly 12b which tripper arm is caused to pivot by the weight of arm 37b to engage and trip up the dog assembly 10 into article-engaging position when piston rod 36b of actuating cylinder 14b is in retracted position because of the lack of an air supply thereto. Conversely when air is supplied to actuating cylinder 14b, piston rod 36b is extended (e.g., moved to the left in FIGURE 14) to bear against arm 37b and cause tripper arm 32b to be lowered to non-engaging position with lever 42b of dog 34b. FIGURE 8 shows the bell crank assembly in position on the machine frame adjacent to a shuttle conveyor segment which moves back and forth on rollers 48b.

Another embodiment of the invention is shown in FIGURES 10 through 16. The conveyor on which the article propelling means is mounted in this embodiment of the invention provides a rectangular forward, down, backward, and upward movement in a repeating cycle rather than a straight back-and-forth shuttle motion as described heretofore. This motion is provided by a walking beam conveyor device. The walking beam is a bar member 2a which is constantly moved in a rectangular motion by drive mechanisms providing both horizontal and vertical motion. For example, in the aforementioned commonly owned and copending applications of Umbricht et al., a number of walking-beam apparatus are described which are used in conjunction with the shuttle and fill-up apparatus disclosed herein. In this case the article is picked up at a rearward station and moved forward and deposited in a precisely-determined position at the forward station. Conveyors of this type include the walking-beam-type apparatus such as is described, for example, in the copending application and patents mentioned above.

The conveyor described below comprises a walking beam similar to that described in the specification and drawings of Patent No. 3,179,171. The walking beam 32b shown on the drawings of this patent corresponds in function and operation to the walking beam 2a in FIGURES 11 and 16. FIGURE 1 of this patent and the description thereof in the specification illustrate the drive by which vertical and horizontal movement is imparted to the walking beam causing a roughly rectangular cycle through which the walking beam, and thus parts attached to it, are moved. Thus the drive illustrated in said FIGURE 1 of this patent provides a horizontal movement by the motion of a lever 47 therein described and a vertical motion by a rotating cam wheel 22. This rectangular motion is perfected by various lost motion devices shown in the copending application and patents.

Figure 11:
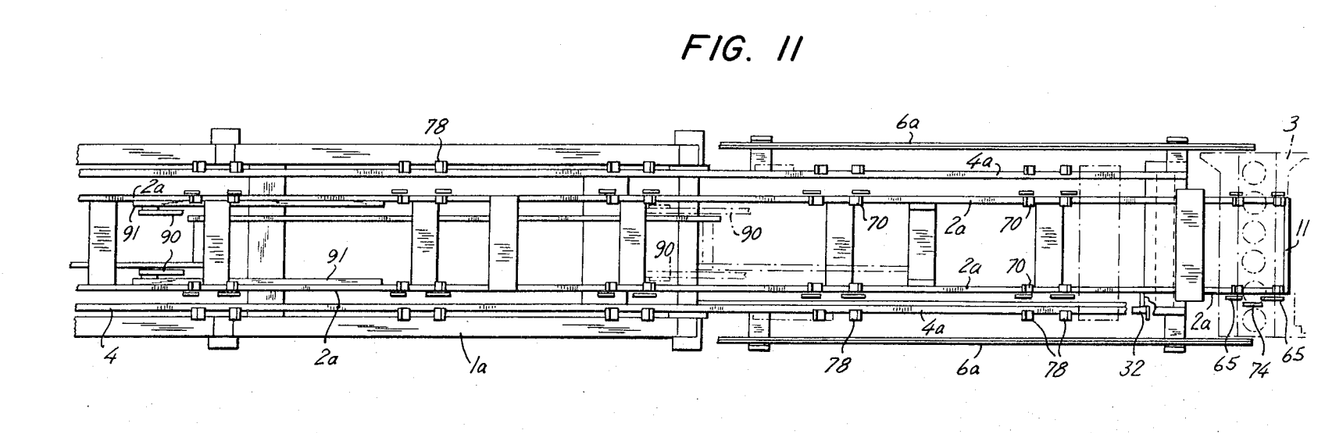
FIGURE 11 is a plan view of a section of a walking beam conveyor showing the relationship between the main frame, shuttle carriage and tracks in which said carriage operates.
Figure 16:
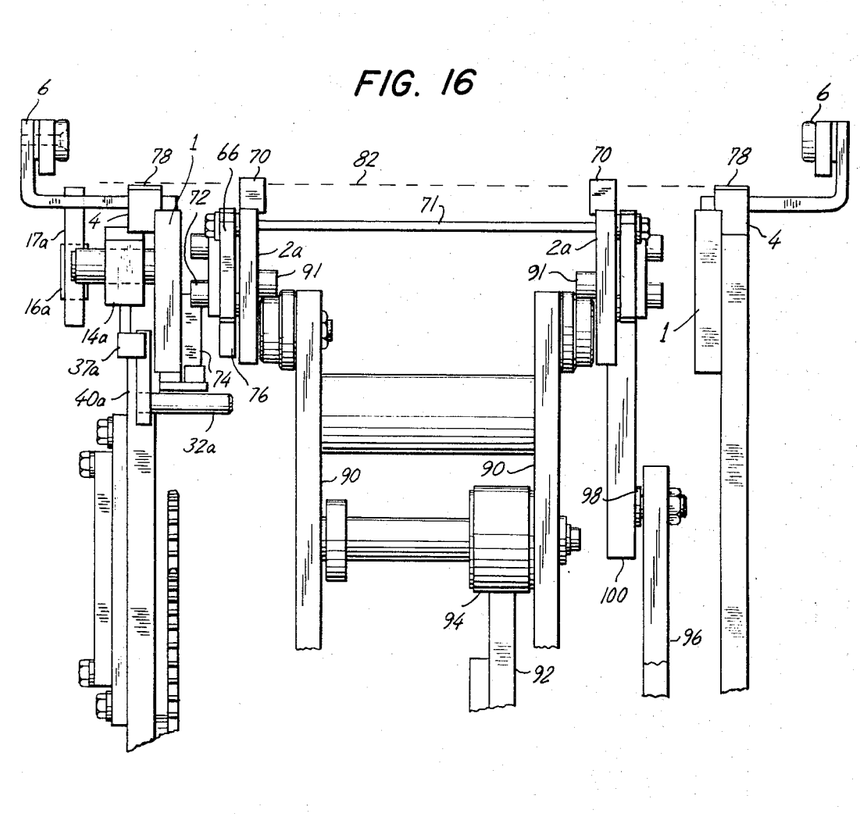
FIGURE 16 is an elevational view of the conveyor line of FIGURE 10 seen from the end of the conveyor line showing more detail concerning the placement of the collapsing parallelogram in relation to other equipment.

The walking beam 2a shown in FIGURES 11 and 16 is used on conjunction with a means for temporarily disabling the feed device. In this instance it is shown as a collapsing parallelogram assembly 65 (which forms the holder device on the walking beam 2a) and a stationary tripper assembly attached to the frame of the conveyor which collapses the assembly 65 so that it cannot engage, and carry along, the articles 3.

Referring to FIGURES 11 and 16, it is seen that walking beam 2a is carried on lift arms 90 which operatively engage ribs 91 and which are caused to move upward and downward by the non-circular surface of rotating lift cam 92 acting on a cam follower 94. As this vertical motion proceeds during rotation of lift cam 92, crank arm 96 is reciprocated to and fro by a crank, not shown causing cam roller 98 to engage vertical and opposed cam faces of a vertical slot in vertical member 100 attached to the beam 2a, thereby causing the walking beam to move back and forth, i.e., left to right and vice versa in FIGURE 8. Thus cam 92 and lift arm 90 are analogous to "cam 22" and "lift arm 28b" of this patent, numbered 3,179,171, and similarly crank arm 96 and cam follower roller 98 are analogous to "lever 47" and "cam follower arm 57."

Figure 10:
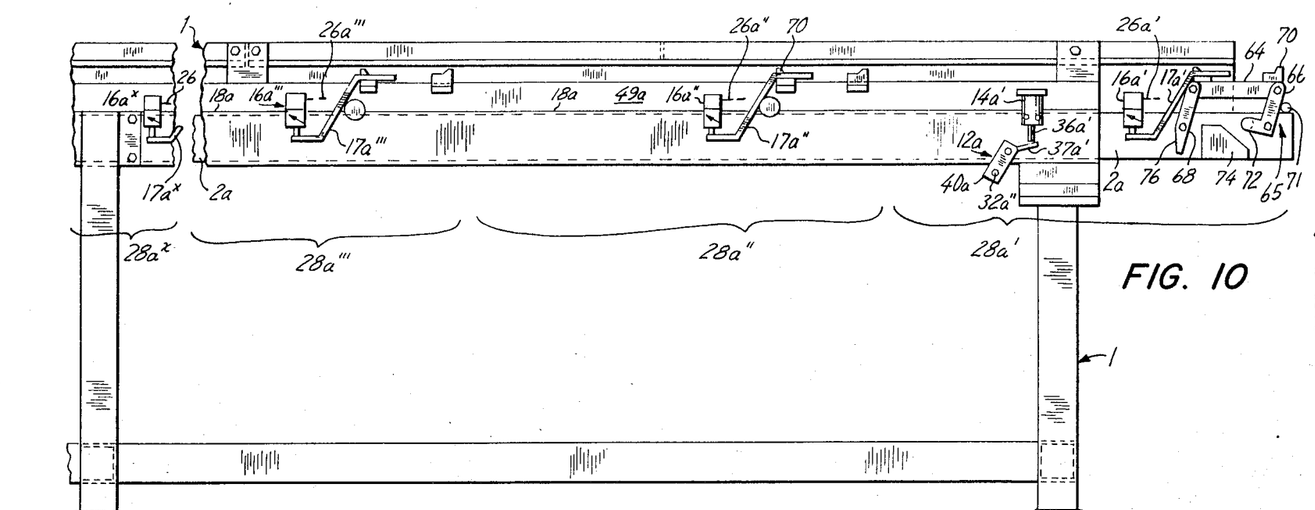
FIGURE 10 is a side elevational view of a walking beam conveyor section showing the positions of parts advantageously used in the present invention.
Figure 12:
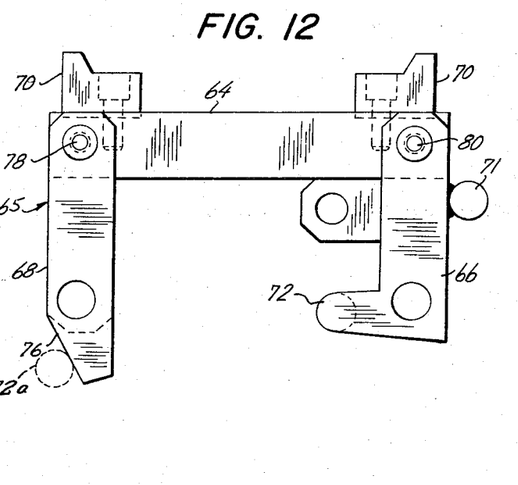
FIGURE 12 is an elevational view of a collapsing parallelogram as it would appear from the side of a conveyor line.
Figure 13:
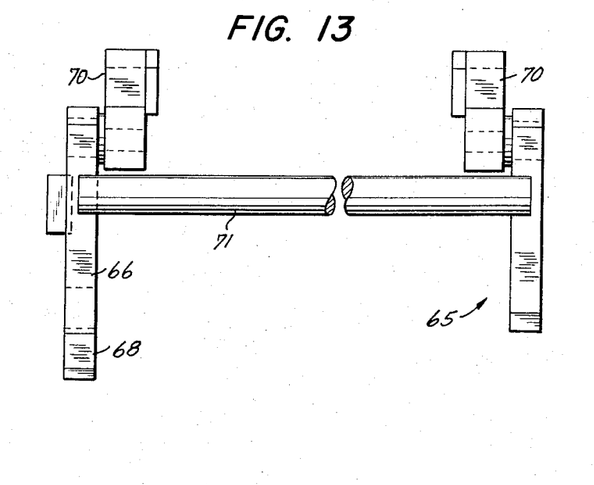
FIGURE 13 is an elevational view of a collapsing parallelogram as it would appear from the end of a conveyor line.

FIGURES 10, 12, and 13 are front and side views of a novel article-propelling means of a parallelogram article-propelling means 65 which is adapted to be raised for picking up a part 3 or collapse to pass it by. This assembly is adapted to be carried back and forth, up and down on a walking beam-type member 2a, as is described in the aforementioned references. A walking-beam-type has attached to it, in series, collapsing parallelogram article-propelling means which are carried on the walking beam back and fourth between two stations. For example, a walking beam carries propelling means 65 back and fourth between stations 28a' and 28a". The propelling means 65 are operated synchronously, each being so attached to the walking beam that it is in the same position relative to its two-station cycle, at any given time, as all the other means 65. Under certain conditions as described below, the propelling means is adapted for picking up an article on its upward motion and carrying it forward one station and setting the article in place at the forward station on the downward movement of its cycle.

For clarity FIGURE 10 is shown with part of the frame removed and only one collapsing parallelogram propelling means is shown, but it is to be understood that there is such a means for each station, for example 28a', 28a" and 28a'" as shown in FIGURE 10. Similarly stationary cam 74, actuating motor 14a and bell crank 12a, all more fully described below, are shown only in association with the illustrated propelling means but should be understood to be present at other stations such as those wherein mechanically operated valves 16a are shown on FIGURE 10.

The collapsing parallelogram assembly 65, as shown in station 28a' in FIGURE 10 and in FIGURES 12 and 13, comprises horizontal members 64, forward legs 66, rearward legs 68, a cam roller 72 for collapsing the parallelogram structure by engaging a stationary cam 74 mounted on the frame of the apparatus, and thus swinging the legs 66. Article-positioning steps 70 on the horizontal members 64 and legs 66 at opposite sides are connected by shaft 71, as shown in FIGURES 13 and 16.

In a normal cycle, the parallelogram assemblies 65 are carried forward on the walking beam assemblies from station to station (i.e., toward the right on FIGURE 10), then downward, backward and upward to its original position. This cylindrical movement continues over and over between two stations as the machine operates, but only when an article is required in the forwardmost of the two stations will the parallelogram erect so as to lift an article on its steps 70. Then an article will be brought forward.

Referring to FIGURE 10, and assuming an article is in last station 28a', and in each of stations 28a" and 28a'", the weight of an article mechanically maintains valve 16a' in operating position by pivoting feeler mechanism 17a'. Thus air flows through pressure line 18, as described in the schematic diagram of FIGURE 2, to the next preceding station, in this case station 28a". If an article is in station 28a", valve 16a" in this station is also maintained in operating position by the article's weight on feeler mechanism 17a" and the air pressure is conducted therethrough to the next preceding station, and so on from station to station until the absence of an article in x station allows the valve 16a$^x$ to remain in non-operating position and thus prevents air from proceeding to other stations further along the line allowing, as will be seen, such as other stations to forward articles toward the empty station 16a$^x$.

In addition to providing an air supply to valves 16a of the next preceding station, air is also supplied to actuating motors 14a of the next preceding station through valve 16a of the succeding station when in operating position as determined by the presence of an article in the succeeding stations, as described above. Thus air supplied to actuating motor 14a' through valve 16a' extends piston rod 36a', projecting it down against arm 37a', thus causing bell crank 12a to pivot and thus raise its bar 32a (see FIGURES 11, 12, 14 and 16) so as to lie in position to engage the truncated face 76 of the collapsing-parallelogram article-propelling means 65 on the lower return stroke of the walking beam 2a. The occurrence of such engagement determines whether the parallelogram means 65 will be erected so as to bring its steps 70 to a level where they will engage the article 3 to carry it forward from station 28a" to station 28a'.

This control of forward movement of articles is accomplished in a manner best shown by reference to FIGURE 10 considering the action of the collapsing parallelogram.

Assuming first that an article 3 has just been deposited at station 28a', the collapsing parallelogram structure will then be carried downward by the walking beam carrier from the position in which it is shown in FIGURE 10 leaving the article 3 behind on the fixed steps 78. The parallelogram 65 is next carried, on the walking beam backwards, i.e. to the left in FIGURE 10. Cam roller 72 on front legs 66 is, on this part of the movement, low enough so that the stationary cam 74 mounted on the frame of the apparatus engages the roller 72 on the foreleg 66. This engagement with cam 74 forces the parallelogram assembly to its erect position. Thus cam 74 will have no effect on a parallelogram assembly which is already erect, but it will set up such assembly which was collapsed during the previous cycle.

However, as has been seen above, the presence of an article deposited on the steps 78 in station 28a' results in the turning of bell crank 12a and the raising of bar 32a" to a position where it trips foot 76 (see FIGURES 10 and 14), as described above, and thus provides means for causing the collapsible article propelling means 65 to collapse to a position in which it cannot pick up and carry articles forward during its next cycle. This is accomplished as follows:

Vertical leg 68 has a truncated face 76 which, on moving backwards still further, contacts bar 32a" of bell crank assembly 12a when bar 32a" is in raised position. When bar 32a" does contact the vertical member 68, the parallelogram assembly 65 collapses, because member 68 is forced to pivot about pivot point 78 and members 66 and 64 are forced to pivot forward about pivot point 80 and thereby cause the horizontal bar 64 and article-positioning members 70 to be lowered. On the forward raised motion face 76 always clears the top of bar 32a.

The parallelogram assembly then raises to station 28a" and moves forward to station 28a' and thus into another cycle, but this time moving forward in its lowered position below the article-support level 82 shown in FIGURE 16 and thus not propelling forward a part which is not required.

A different situation exists on the rearward movement of the parallelogram assembly if no part is in station 28a':

Assume that the parallelogram assembly has just moved forward and downward, and backward through that portion of its backward cycles, previously described, where contact between cam 74 and cam roller 72 assure that the propelling means 65 is in its raised, i.e., not collapsed, position. Assume also that an article has been removed from some station downline causing air supply to the actuating cylinders 14a of preceding stations to be cut off. In this case, bar 32a'' will be in a lowered position because no air will be supplied to valve 16a' and thus no air to actuating motor 14a'' which would extend piston rod 36a'' and raise bar 32a'' as described above.

In this situation, the action of the cam roller 72' which has engaged stationary cam 74' (see FIGURE 10) and forced the parallelogram assembly to rise up, as described above, is not counteracted. This parallelogram assembly completes its cycle in the upward position and therefore carries an article forward from station 28a'' to 28a'. The weight of the article is supported by bar 71 and the parallelogram assembly is thus maintained in an erect position when carrying weighty articles.

From this description it is seen that on each backward pass, the mechanism determines, with reference to the presence or absence of a part in the forward station of the two-station cycle or any other forward station, the correct position of the parallelogram propelling means to be assumed for the next forward motion, and thereby controls the movement of articles from station to station. In normal operation, a plurality of stations is arranged serially each station having a collapsing parallelogram-type propelling means which operates, on the walking beam, between its own station and one other station.

A third embodiment of the present invention is shown in FIGURES 17–20. The conveyor which comprises the article propelling means in this embodiment provides a rectangular down-forward-up motion to the article with a backward recovery motion of the conveyor to a position ready for the next indexing motion. This motion is provided by a walking beam carrier device which differs from the walking beam type disclosed in FIGURES 10–16 in that it is not of the lift-and-carry variety (such as disclosed and claimed in the aforementioned Patent No. 3,179,171). In this third embodiment, the walking beam mechanism includes a bar member 2d (see FIGURE 17) which is moved only horizontally in a back and forth shuttling motion. This walking beam mechanism differs from the shuttle conveyor because the walking beam 2d actually supports and carries forwardly the articles resting in fixed position thereon instead of having the articles slid along stationary rails, as in a true shuttle conveyor.

At each station 28d in this embodiment is a perch assembly 102 which is adapted to support an article 3d in that station in a rest position above the walking beam 2d. The perch assembly 102 is capable of lowering the article into a saddle 104 fixed on the walking beam 2d for indexing forward and thereafter to remove another article from the next following saddle 104 to raise it back into the rest position, all in response to the controlling means, which is diagramatically set forth in FIG. 20. The saddle 104 is functionally equivalent to the article positioning steps 70 in the lift-and-carry type walking beam illustrated in FIGS. 10–16.

Figure 17:
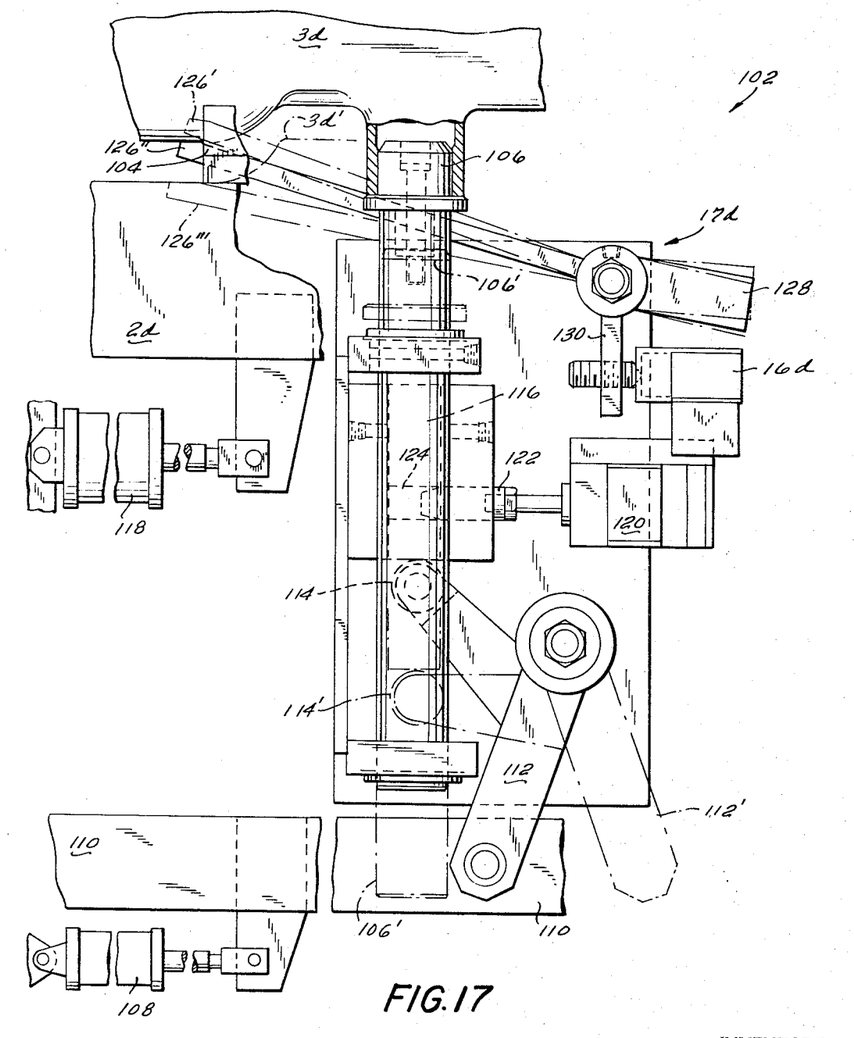
FIGURE 17 is a side elevational view of the mechanisms for supporting the article in the rest positions, for lowering the article to the walking beam, for sensing the presence of an article, and for deactivating the lowering of the article.
Figure 18:
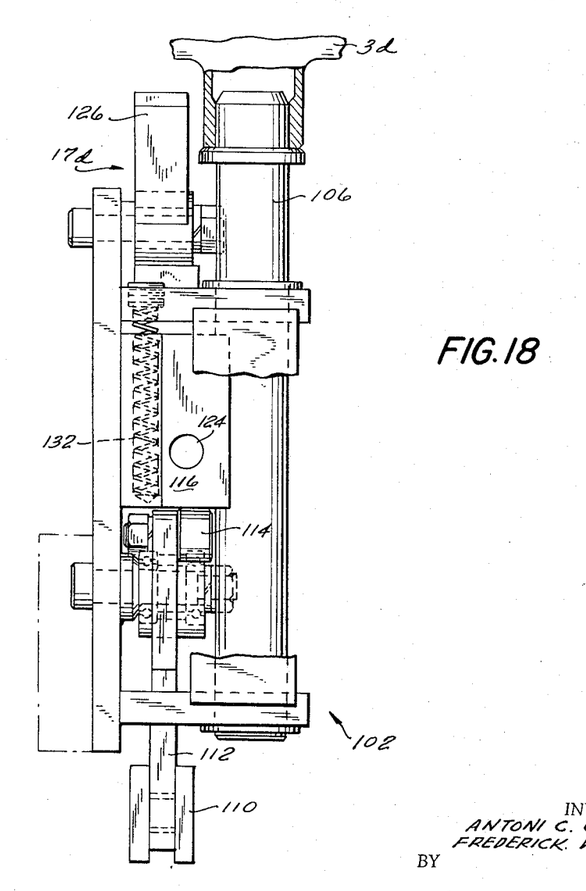
FIGURE 18 is an end view of the mechanisms illustrated in FIGURE 17.
Figure 19:
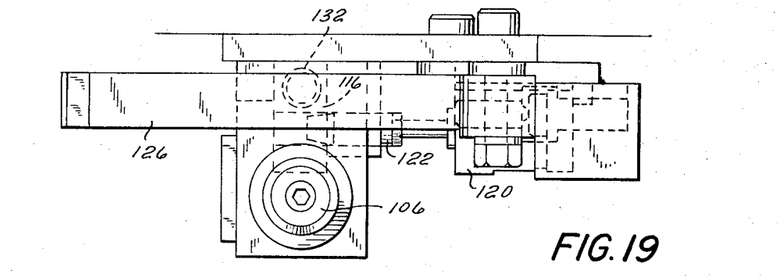
FIGURE 19 is a plan view of the mechanisms illustrated in FIGURE 17.

Referring to FIGURE 17, and article 3d (represented here shown as a brake drum or the like in full lines in the raised rest position) is supported in the up position by the vertical support pin 106. When the article 3d is to be indexed forward the support pin 106 is lowered to the position indicated in dash-dot outline (and indicated by reference numberal 106'). This deposits the article 3d into the saddle 104 carried by the walking beam 2d. This article in the lower position is shown in fragmentary dash-dot outline as article 3d'.

In other words, the normal transfer motion consists of the pneumatic motor 108 extending the pull bar 110 to the right causing the bell crank 112 to pivot counterclockwise (as illustrated in FIGURE 17) to the dash-dot outline indicated by reference numeral 112'. This rotation of the bell crank 112 causes the roller 114 connected to the upper arm of the bell crank to drop to the position indicated by reference numeral 114'. An arresting block 116 is fixed to the vertical support pin 106. This arresting block 116 bears on the roller 114 whereby the position of this roller controls the vertical attitude of the arresting block and its connected vertical support pin 106 and thereby any article 3d on said support pin.

Thus, when the pneumatic motor 108 extends the pull bar 110 this drops all of the support pins 106 in each of the stations 28d depositing any parts 3d carried thereby into the saddles 104 on the walking beam 2d. The walking beam is then extended by pneumatic motor 118, moving any articles 3d carried thereby from a given station $28^x$ to the next forward station $28^{(x-1)}$. At the next forward station $28^{(x-1)}$, the process is reversed with the pneumatic motor 108 being retracted pulling the pull bar 110 back to its normal position raising the vertical support pin 106 to lift off the article newly presented to the given station $28^{(x-1)}$ and raising it into the elevated rest position.

This normal walking beam cycle is interrupted by the accumulating feature to prevent articles 3d from being advanced into stations which already have accumulated articles (i.e., articles which are not to be moved during that transfer cycle). This interruption in the normal transfer cycle is accomplished by a deactivating means which in this embodiment is a small air cylinder 120 adapted to extend a locking shot pin 122 into a hole 124 in the arresting block 116. The function of the air cylinder 120 is analogous to that of the actuating cylinder 14 and 14a in the two previous embodiments.

At any given station (e.g., $28d^x$), that air cylinder $120^x$ is most immediately controlled by the pneumatic slide valve $16d^x$ which permits or blocks the passage of the main air supply at that position depending upon the rotary position of the feeler mechanism 17d. This feeler mechanism 17d has a sensing arm 126, a counterweight arm 128 and a valve arm 130 depending from the pivot point. This mechanism may also include a spring 132. Thus, when a part is present in a given station, the sensing arm 126 is depressed from its normal rest position 126' to the part present rest position 126'' or to the part lowered position 126''' within that given station.

Figure 20:
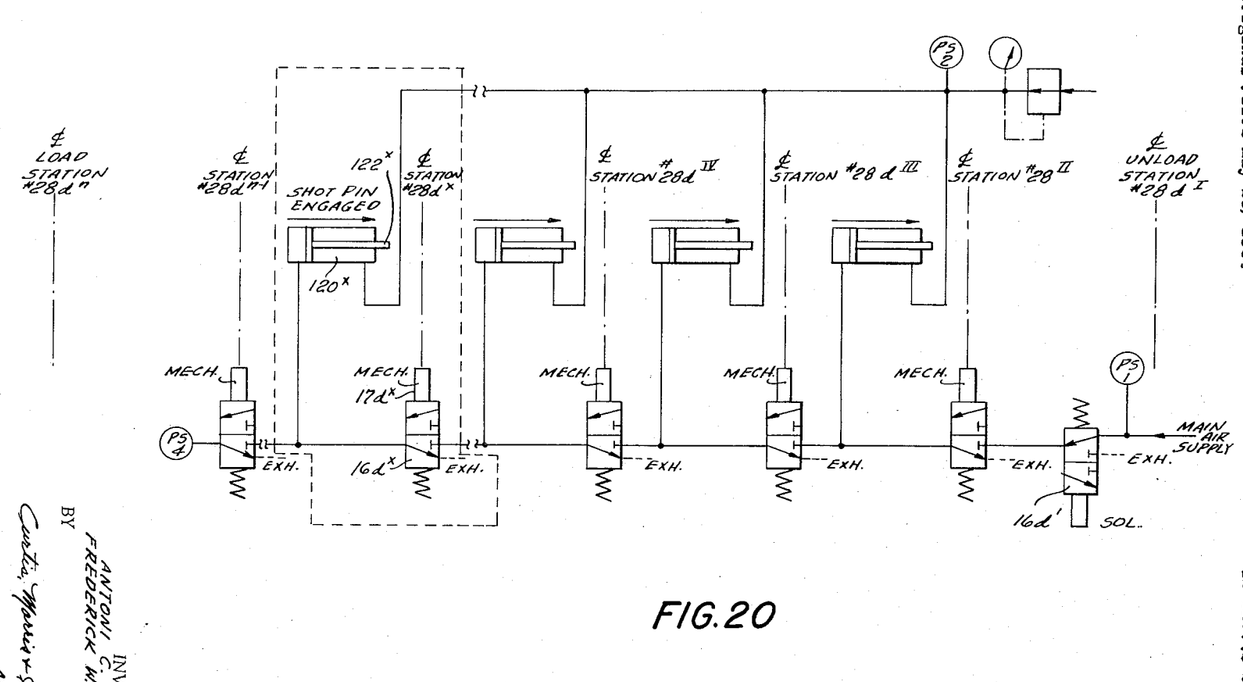
FIGURE 20 is a schematic diagram of the controlling and communicating means for the apparatus illustrated in FIGURES 17 to 19.

The role of the feeler mechanism 17d, the slide valve 16d, and the locking shot pin 122, will be more evident by reference to FIG. 20. One of the interesting variations brought out in the third embodiment illustrated in FIGURE 20 when compared to the first embodiment illustrated in FIG. 2 is that the slide valve $16d^x$ controls the locking shot pin $122^x$ in the same station whereas in the previous embodiments the slide valve $16^x$ controlled the actuating cylinder $14^{(x+1)}$ in the next rearward station. This variation is possible because the slide valve $16d'$ (whether solenoid operated or mechanically operated) which is operatively connected with the unload station $28d'$ has no locking shot pin 122 connected with the unload station but controls the next rearward station, namely station 28''. Thus, the valve $16d'$ is controlled not by whether there is an article present at the unload station $28d'$, but is controlled by whether an article will be necessary in the unload station on the next transfer motion. This can be controlled by an interlock with the machine which the accumulator is feeding (which interlock will indicate when that next machine desires an article) or it can be a manual control, or some similar control mechanism.

The reason that the pneumatic circuit of FIGURE 20 works just as well as the pneumatic circuit of FIGURE 2 can best be appreciated by considering a typical station $28d^x$ (indicated in dotted outline in FIGURE 20). As long as there is a part absent from any of the previous stations then no air will get back to the valve $16d^x$ and the walking beam will function normally at station $28d^x$ because the locking shot pin $122^x$ will not be activated.

However, assuming that all the previous stations have accumulated articles (in other words there is no requirement for a new article at the unload station and all the other following stations are filled up with articles including station $28d^x$) then, if there is an article in the next rearward station (namely station $28d^{(x+1)}$), the valve $16d^{(x+1)}$ at that station will actuate the locking shot pin thereby deactivating the effect of the walking beam transfer at that station preventing that article from being advanced from that station $28d^{(x+1)}$ into the next station $28d^x$.

Assuming the alternative condition, there is no part in the next rearward station $28d^{(x+1)}$, therefore it makes no difference whether the locking shot pin $122^{(x+1)}$ is activated or not, because the walking beam mechanism will have no part to advance whether its perch assembly is in a condition to advance or not. Therefore, so long as there is a next rearward control with respect to the unload station only, it thereafter makes no difference whether the typical following station is controlled with respect to the presence of an article at that station as was done in FIG. 20, or with respect to the presence of an article in the preceding station as was done with respect to FIG. 2.

In analyzing the control "circuits" of this invention (whether they be pneumatic or otherwise) it is generally most helpful to appreciate that it is the use of a *signal* (air pressure, in the preferred embodiments) supplied *in series* between the valves 14 (with a parallel return or exhaust) that gives the accumulate feature. Since the signal flows in series, the interruption of the signal at a point (with simultaneous exhausting of any residual signal from downstream) causes everything connected downstream of that point to be in a position to advance articles. This follows because the receipt of a signal by a deactivating means at a station, means that no part will be advanced from that station. Thus the interruption of a signal at a point, causes articles beyond that point to be advanced.

Figure 21:
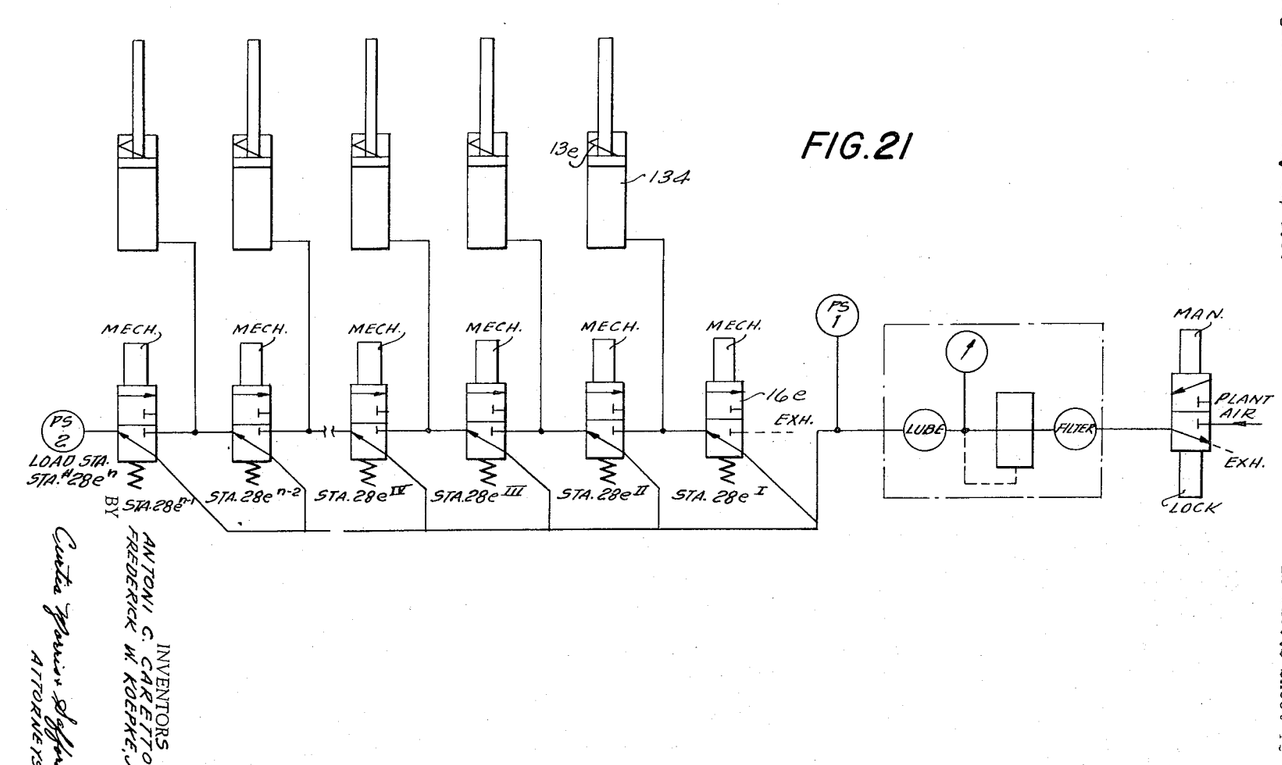
FIGURE 21 is a schematic diagram similar to FIGURE 2 and FIGURE 20 of still another embodiment of the present invention.

The fourth embodiment of the present invention is disclosed in FIGURE 21 which introduces a "fail safe" feature to the accumulating control. In this fourth embodiment, it should be noticed that the main air supply (normally plant air) is furnished in parallel to the pneumatic slide valves 16e and the air exhausts serially through these valves to the atmosphere. The significance of this reversal, when compared to FIGURES 2 and 20, is that should the main air supply be broken anywhere in the pneumatic circuit causing a failure in the air supply, then the actuating or deactivating air cylinders 134 (analogous to cylinders 14 and 120) will *all* be returned to their rest positions by the springs 13e. To take advantage of the "fail safe" feature, the cylinders 134 are mounted so that no part is advanced when these cylinders are in their rest position. Referring to FIGURE 21, since the absence of air pressure at the cylinder 134 is the same condition as if all the valves 16e has been depressed indicating parts present at each station, therefore no parts will be forwarded even though the transfer mechanism continues to cycle.

If the circuit in FIGURE 21 were applied in place of the circuit illustrated in FIGURE 2 to the mechanism illustrated in FIGURE 3, then cylinder 134 and cylinder 14 would be identical except the action of the cylinder would be reversed. Namely, the actuating of the elevation of the dogs 34 would be accomplished by extending the piston 36 and the deactivation of the erection of the dogs would be accomplished by a retraction of the piston rod 36, so that the cylinder 14 would have to be mounted in the opposite direction and on the other side of the arm 37 (all with reference to FIGURE 3). With this circuit and modification of the mechanism in FIGURE 3, one would have a "fail safe" accumulator.

Note also that the circuit in FIGURE 2 could be modified to have the "fail safe" feature by having the main air supply 18 at a lower pressure (e.g., vacuum), than the air pressure occurring at the exhaust ports 26. This would require a reversal of the springs 13 so as to extend rather than retract the piston rods 36 and again the direction of action of the piston 36 with respect to the arm 37 would have to be reversed as was done with respect to the modification outlined above for the circuit illustrated in FIGURE 21.

Referring again to FIGURE 20 the function of the springs 13 have been replaced by an auxiliary pneumatic circuitry which acts to return the cylinders 120 to the locking-shot-pin-unengaged position when no air pressure is applied to the piston end of the given air cylinder 120. This secondary air supply can be the same as the main air supply if the surface area of the back of the piston and of the stem end of the piston are sufficiently different to result in a different total pressure so that when the two are simultaneously applied and therefore counteracting each other, the air applied to the piston end will cause the air cylinder 120 to extend the locking shot pin 122.

It will be appreciated that the variations in the lifting mechanism associated with the perch assembly in the third embodiment of the present invention and its associated deactivating means may be varied in many ways without departing from the scope of the presently disclosed invention. The same is true with respect to the pneumatic circuitry in FIGURES 2, 20, and 21 and the discussion with respect thereto in applying different combinations of pressure differentials including vacuums and higher pressures in both "fail safe" and other variations all within the scope of the invention as presently disclosed.

We claim:

1. A walking beam transfer apparatus for maintaining an unbroken flow of articles to a terminal comprising a plurality of stations where said articles respectively are held in readiness, controlling means at each station, positive article-propelling means for said articles respectively for moving articles simultaneously from each rearward station to the station forward thereof as required, and article sensing means operable by an article present at each said station to direct a signal through said controlling means to each rearward station, and means associated therewith responsive to said signal to control the operation of said propelling means to advance the articles only when a vacancy occurs in any of the forward stations, said article-propelling means being a parallelogram assembly mounted on said walking beam transfer apparatus and is operatively responsive to said signal to collapse into a non-propelling position when stations forward of the rearward station from which said propelling means is adapted for advancing an article are supplied with articles.

2. An accumulating transfer apparatus for maintaining an unbroken flow of articles at a terminal position comprising a plurality of stations for said articles, controlling means, article-propelling means for moving articles substantially simultaneously from each rearward station to the station forward thereof, and article sensing means at each station for sensing the presence of an article at that station when all preceding stations are full and communicating such presence to said controlling means, said controlling means in response to sensing the presence of articles accumulated back from and including the forwardmost station prevents said propelling means from advancing any of the accumulated articles, whereby only all of the articles rearward of any vacant station on the transfer apparatus are advanced substantially simultaneously station-by-station, said article-propelling means being a walking beam transfer apparatus comprising a walking beam for carrying said articles horizontally, means for vertically transferring respective articles between their rest stations and said walking beam, and deactivating means operatively responsive to said controlling means for preventing accumulated articles from being transferred to said walking beam.

3. An accumulating transfer apparatus for maintaining an unbroken flow of articles at a terminal position comprising a plurality of stations for said articles, controlling means, article-propelling means for moving articles substantially simultaneously from each rearward station to the station forward thereof, and article sensing means at each station for sensing the presence of an article at that station when all preceding stations are full and communicating such presence to said controlling means, said controlling means in response to sensing the presence of articles accumulated back from and including the forwardmost station prevents said propelling means from advancing any of the accumulated articles, whereby only all of the articles rearward of any vacant station on the transfer apparatus are advanced substantially simultaneously station-by-station, said controlling means comprises a null signal network having cascade connected switching means each for receiving any null signal from the next forward station and for passing along said signal only if the sensing means with which said switching means is respectively associated indicates an article present at that given station and further having deactivating means at each station for preventing the movement of an article from such station in response to the receipt of said signal, said switching means being operatively connected with said deactivating means to prevent articles from being advanced into a given station with which a given switching means is associated when said given switching means passes a signal.

References Cited

UNITED STATES PATENTS

| | | | |
|---|---|---|---|
| 2,948,386 | 8/1960 | Kay | 198—219 |
| 3,270,864 | 9/1966 | Kay | 198—219 |

RICHARD E. AEGERTER, *Primary Examiner.*